June 24, 1930.                F. A. KOLSTER                1,767,140
                           RADIO COMPASS INDICATOR
                             Filed Feb. 26, 1927
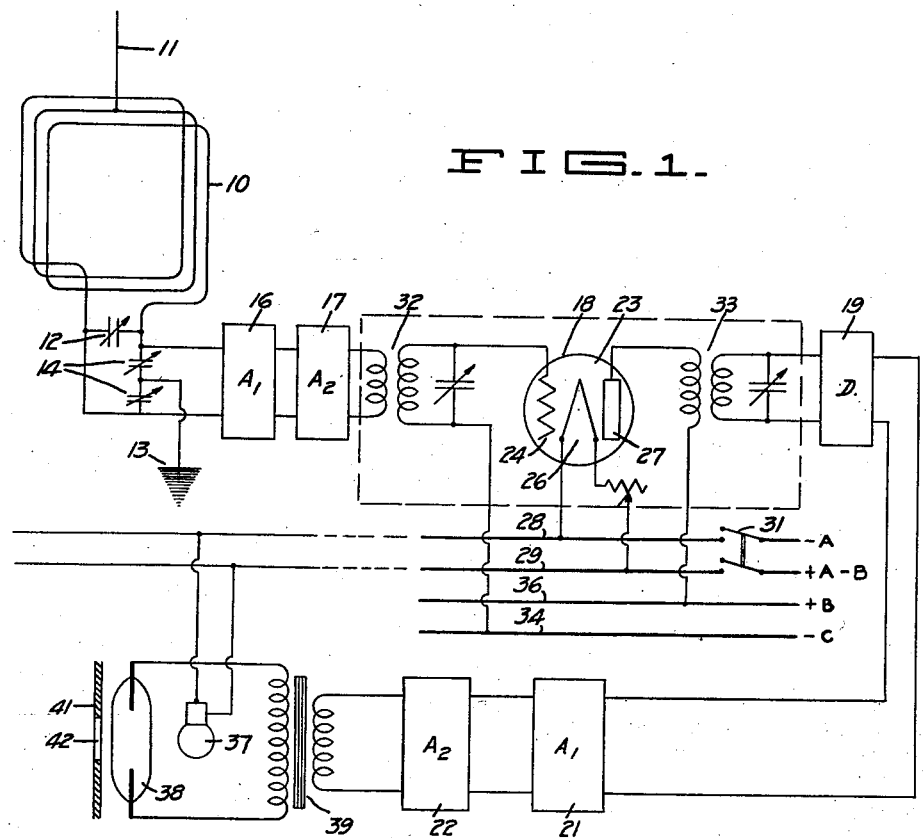
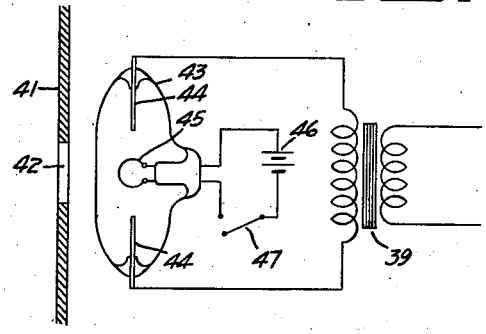
INVENTOR
FREDERICK A. KOLSTER
BY
his ATTORNEYS.

Patented June 24, 1930

1,767,140

UNITED STATES PATENT OFFICE

FREDERICK A. KOLSTER, OF PALO ALTO, CALIFORNIA, ASSIGNOR TO FEDERAL TELEGRAPH COMPANY, OF SAN FRANCISCO, CALIFORNIA, A CORPORATION OF CALIFORNIA

RADIO-COMPASS INDICATOR

Application filed February 26, 1927. Serial No. 171,141.

This invention relates generally to radio receiving systems of the directional type such as are employed for determining the direction and bearing of a radio transmitter.

Direction indicating radio receiving systems, which are commonly known as radio compass systems, generally employ a rotatable antenna to which is coupled a suitable receiver. By comparing the strength of the signals received from a given radio transmitter for different positions of the antenna, the bearing or direction of the transmitter may be determined. If the antenna has uni-directional characteristics, as is possible with an antenna system such as described in the Kolster Patent No. 1,447,165 issued February 27, 1923, the critical bearing position may be determined by the position of minimum signal strength. It has previously been proposed to modify such a system by providing visual indicating means for indicating both the characteristics of a signal being received, and the critical position of the antenna. A system of this kind has been shown in my co-pending application No. 32,029 filed May 22, 1925 and entitled "Directional radio system" and consists of a lamp controlled by a magnetic relay, the relay being energized by the radio receiver. While the system described in that application gives good results, it produces a negative rather than a positive indication of the critical antenna position, and does not properly indicate an operable condition of the receiver when no signals are being received.

It is an object of this invention to devise a radio compass system which will give a positive indication of a critical bearing position.

It is a further object of this invention to devise a radio compass system which will include means for indicating that the receiver is in operable condition and for indicating a critical bearing position of the antenna.

It is a further object of this invention to devise a novel form of visual indicating apparatus for a radio compass which will dispense with the use of magnetic relays.

Further objects of this invention will appear from the following description in which I have set forth the preferred embodiment of my invention. It is to be understood that the appended claims are to be accorded a range of equivalents consistent with the state of the prior art.

Referring to the drawing:

Fig. 1 is a circuit diagram illustrating the system of this invention.

Fig. 2 is a detail showing diagrammatically an indicating apparatus suitable for use in the system of Fig. 1.

The invention consists generally of a plurality of visual indicating lamps which are associated with a common receiver. These indicators are coordinated in such a manner that a light having certain color characteristics is produced when signals are being received. When the antenna is turned to a critical position at which the signal strength is minimum, a light indication of another color is produced. A light indication is also produced when the receiver is put in operable condition, even though it is not receiving signal energy.

Thus referring to the drawing there is shown a directional antenna 10 in the form of an inductive loop mounted so that it may be rotated around a vertical axis. In order to secure uni-directional characteristics, the loop 10 is combined with a nondirectional antenna 11, in a manner described in the Kolster patent referred to above. The loop is tuned by means of a variable reactance such as a variable condenser 12, and the two branches of the loop are balanced electrically with respect to a ground connection 13, by means of variable reactances 14. The receiver may be of any suitable type which will secure proper amplification and detection of the signal energy received by the antenna. The particular receiver shown includes a plurality of electron relay amplifiers 16, 17 and 18 connected together in cascade, the last stage of amplification supplying a suitable integrating device or detector 19. The output of detector 19 is preferably amplified in one or more audiofrequency amplifiers 21 and 22. In order to illustrate how an indication is secured when the receiver is made operable, one of the radio frequency amplifiers has been shown as comprising a conventional form of electron relay 23 having the usual grid 24, filament 26 and plate or anode 27. The filament 26 is connected to bus conductors 28 and 29, which in turn are connected to a suitable source of "A" battery potential. In practice the filaments of all of the electron emission relays used in the receiver are similarly connected to the bus conductors 28 and 29 so that opening of a switch 31 in the "A" battery circuit serves to render the entire receiver inoperable. The input of amplifier 18 may be coupled to the output of the preceding amplifier by means of a suitable coupling transformer 32, while the output may be coupled as by means of transformer 33 to the input of amplifier 19. In order to place the proper negative bias upon grid 24 the input circuit may be connected to the "C" battery bus conductor 34. The output of this relay may be energized by a connection to a "B" battery bus conductor 36.

The means for securing the desired visual indications includes a plurality of lamps 37 and 38, the lamp 37 being preferably of the filament type while the lamp 38 is preferably of the gaseous discharge type. This lamp should give a characteristic color glow when energized. For example one type of lamp giving good results contains neon gas under low pressure and produces a peculiar orange glow which is readily distinguishable from the yellowish light of a filament lamp. Gas-discharge lamps of this kind will operate directly from the output of an electron relay amplifier without the use of magnetic relays, because of their slight current consumption. One characteristic of such lamps is that no illumination is obtained until the potential is above a certain critical value and the illumination ceases immediately without time lag when the potential falls below this value. Therefore the illumination will faithfully reproduce the coding of signal energy repeated in the amplifier output. The lamp 38 is preferably connected directly to the output of amplifier 22, a step up transformer 39 being imposed to secure an increase in the potential across the lamp terminals.

The lamp 37 is preferably connected to a source of energizing current in such a manner that it will be illuminated when the receiver is placed in operable condition. A convenient way in which this can be accomplished is to connect the lamp 37 across the bus conductors 28 and 29 as shown, so that when switch 31 is closed to energize the filaments of the electron relays, the filament of lamp 37 is also illuminated. Both of the lamps 37 and 38 are preferably placed behind a suitable screen 41 which is provided with an aperture or window 42 for observing the illumination. Lamp 37 is preferably disposed so that it must be viewed through the lamp 38, in other words lamp 37 is placed directly behind lamp 38.

In operating the system as described above, switch 31 is first closed to place the receiver in operable condition. The lamp is at once illuminated so that the observer will know that the receiver is in condition to be tuned to any given signal source. The antenna and receiver are then tuned to the signal energy coming from a transmitter by means of which a bearing observation is to be made. This signal energy when amplified by the receiver, is sufficient to illuminate or cause the lamp 38 to glow. The illumination will not be steady but will be interrupted in accordance with the coding of the signal energy. Because of the characteristic glow which is obtained from lamps containing gases such as neon, the illumination produced by this lamp will obliterate the illumination obtained from lamp 37 so that an observer in front of screen 41 is given a positive indication of the reception of signals. When the antenna 10 is rotated by the observer about a vertical axis, a position will be found in which the signals are of minimum strength and the plane of the loop will then indicate the approximate direction or bearing of the radio transmitter. With the antenna in this position the potential across lamp 38 will be insufficient to effect its illumination with the result that this critical position will be indicated to the observer by the predominance of the illumination from lamp 37.

Instead of providing separate lamps 37 and 38, they can be combined as a unitary structure as shown in Fig. 2. In this case there is provided a single evacuated vessel 43 containing electrodes 44 and filament 45. The vessel contains a small amount of neon or other gases which will readily ionize to produce a glow having a characteristic color when sufficient potential is imposed across electrodes 44. Filament 45 is associated with the receiver in a manner similar to lamp 37 described above, this association being diagrammatically illustrated by an energizing circuit including battery 46 and switch 47.

The system as described above is particularly advantageous as it dispenses with the use of magnetic relays. However it is obvious that the invention is sufficiently broad to cover the use of electric lamps of the filament type controlled by magnetic relays in order to secure the desired indications. The system may also be modified to employ a plurality of gas discharge lamps in place of lamps of the filament type.

I claim:

1. In a radio compass system having a directional antenna, the method which comprises utilizing received signal energy to produce light of characteristic color, effecting visibility of light of another color when the signal energy is less than a predetermined minimum, and determining from the color of light visible, critical position of the antenna with respect to the source of signal energy.

2. In a radio compass system having a directional antenna, the method which comprises producing a light of certain color, utilizing received signal energy to produce light of other color obscuring the first light, and determining from the color of light visible, critical position of the antenna with respect to the source of signal energy.

3. In a radio compass system having a directional antenna, the method which comprises producing a light of certain color, amplifying received signal energy, producing by the amplified energy a luminous discharge of another color in the line of vision between said first light and an operator of the system, and determining from the color of light visible, critical position of the antenna with respect to the source of received energy.

4. A radio compass system comprising a directional antenna, an apertured member, means responsive to received signal energy to produce light visible through said member, and means to produce light visible through said member for critical position of the antenna with respect to the source of signal energy.

5. A radio compass system comprising a directional antenna, receiving apparatus associated therewith, an apertured member, means to produce light visible through said member during operative condition of said apparatus, and means responsive to signal energy producing light visible through said member and obscuring light produced by said first means.

In testimony whereof, I have hereunto set my hand.

FREDERICK A. KOLSTER.